J. E. PIERCE.
FASTENING DEVICE.
APPLICATION FILED FEB. 11, 1915.
1,157,039.
Patented Oct. 19, 1915.
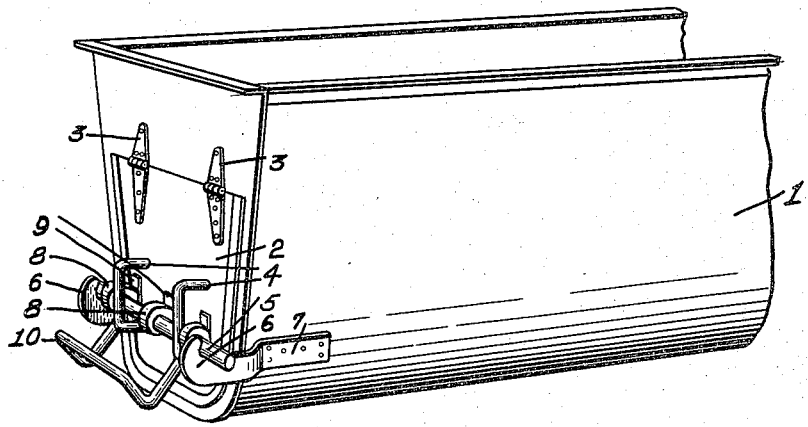
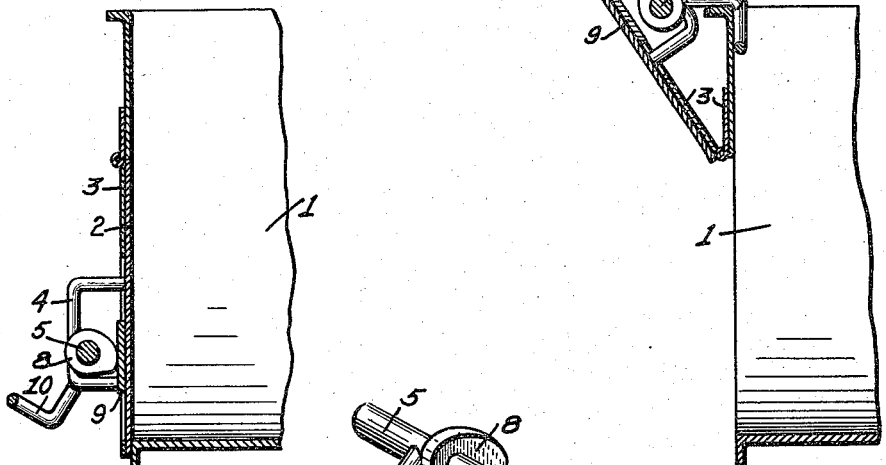
WITNESSES:
P. W. Pomeroy
O. B. Des Jardins
INVENTOR
James Edward Pierce
BY
Chappell & Earl
ATTORNEYS

UNITED STATES PATENT OFFICE.

JAMES EDWARD PIERCE, OF ALBION, MICHIGAN, ASSIGNOR TO THE UNION STEEL SCREEN COMPANY, OF ALBION, MICHIGAN.

FASTENING DEVICE.

1,157,039.  Specification of Letters Patent.  Patented Oct. 19, 1915.

Application filed February 11, 1915. Serial No. 7,644.

*To all whom it may concern:*

Be it known that I, JAMES EDWARD PIERCE, a citizen of the United States, residing at Albion, county of Calhoun, State of Michigan, have invented certain new and useful Improvements in Fastening Devices, of which the following is a specification.

This invention relates to improvements in fastening devices.

The objects of this invention are: First, to provide a simple and effective fastening device for the end gates of dough troughs or for use in similar relations. Second, to provide an improved end gate fastener having cam means by means of which the gate is forced to its seat.

Further objects, and objects relating to details and economies of construction will definitely appear from the detailed description to follow.

I accomplish the objects of my invention by the devices and means described in the following specification.

The invention is clearly defined and pointed out in the claims.

A structure constituting a preferred embodiment of my invention is clearly illustrated in the accompanying drawing forming a part of this specification, in which:

Figure I is a fragmentary perspective view of the end of a dough trough showing the end gate fastened in place by my improved fastening device. Fig. II is a fragmentary, detail, vertical, sectional view through the end of the dough trough, shown in Fig. I. Fig. III is a view similar to Fig. II showing the end gate released and held in open position by the handle of the locking bar. Fig. IV is a detail perspective view of the locking bar showing the locking cams and the handle.

In the drawing similar reference characters refer to similar parts throughout the several views, and the sectional views are taken looking in the direction of the little arrows at the ends of the section lines.

Considering the numbered parts of the drawing, the dough trough 1 has an opening in the end thereof which is closed by the end gate 2 hinged to the end of the dough trough at 3. Fastened to the end gate are U-shaped members 4 which hold the locking bar loosely in place as clearly appears in Figs. II and III. The locking bar 5 is long enough so that it extends beyond the sides of the end gate, the ends of said locking bar being engaged behind the upturned ends of the keeper bars 6 which are secured to the sides of the end trough at 7. A plurality of locking cams 8 are carried by the locking bar 5 and wear plates 9 are carried by the end gate in position to be engaged by the locking cams 8. A handle 10 is carried by the locking bar 5, as shown in Fig. IV, the handle being bent at right angles so as to hook over the upper edge of the end of the dough trough as shown in Fig. III, to hold the end gate raised. The locking cams 8 may be made separately and fixed upon the locking bar 5 in any suitable manner and the same is true of the handle 10. However, I contemplate making the locking bar, handle and locking cams all from one malleable casting.

From the description of the parts given above, the operation of the device should be very readily understood. In Figs. I and II, the parts are shown in the position in which the end gate is fastened. The ends of the locking bar engage the upturned ends of the keeper bar 6 so that the locking bar is securely anchored while the thicker portions of the locking cams 8 engage the wear plates 9 on the end gate to force the end gate securely to its seat in the end of the dough trough. To release the end gate, the handle 10 is lifted to rotate the locking bar 5. This carries the thicker portions of the locking cams 8 out of engagement with the wear plates 9 and allows the operator to lift the locking bar 5 upwardly so that it will be carried out of engagement with the ends of the keeper bars 6. The end gate can then be swung upwardly on its hinges and held in such position by engaging the handle 10 over the upper edge of the end of the dough trough as shown in Fig. III. To fasten the end gate, it is dropped into position, the locking bar 5 is allowed to drop into position behind the upturned ends of the keeper bar 6 and the locking bar 5 is rotated by pushing down on the handle 10, with the hand or the foot, so as to bring the thicker portions of the locking cams 8 into engagement with the wear plates 9 to force the end gate to its seat. By this means, the end gate can be fastened in position so securely that the dough trough is made practically water tight.

While I have shown the locking bar 5 as provided with three locking cams, this is not necessary as one locking cam would be sufficient to do the work. However, for fastening devices of the size which I contemplate using, two cams or more are desirable. I show my handle as bent at a right angle, but this is not essential as it might be made in other forms or the U-shaped handle might be dispensed with and a simple arm on the lock bar substituted therefor. I have shown this fastening device as applied to use for fastening the end gate of a dough trough. It will be evident, however, that this fastening device is equally applicable for use as a fastener for the end gates of wagons or for similar uses and that it is capable of use as a fastening device generally. I, therefore, do not wish to be restricted to the use of this fastening device in the relation in which I have shown it but I desire to claim the fastening device broadly.

I am aware that the particular embodiment which I have here shown is susceptible of considerable variation without departing from the spirit of my invention and, therefore, I do not wish to be restricted to the same. I have found, however, that this particular form is to be preferred and, therefore, I desire to claim the same specifically as well as broadly as indicated by my appended claims.

Having thus described my invention, what I claim as new and desire to secure by Letters Patent is:

1. In a fastening device, the combination with a closure hinged at its upper end, of a pair of fixed keepers having upturned outer ends disposed at the sides of said closure, a locking bar, a pair of U-shaped locking bar retaining members carried by said closure and loosely retaining said locking bar for rotative and lateral movement, so that it may be engaged with and rocked upon said keepers or be lifted therefrom, locking cams fixed on said locking bar, and a handle for said locking bar, said cams being positioned to be actuated by the downward movement of said handle whereby the locking bar may be engaged with the keepers and the cams actuated by a continuous downward movement and the cams released and the locking bar disengaged from the keepers and the closure opened by a continuous upward movement.

2. In a fastening device, the combination with a hinged closure, of a pair of fixed keepers facing the hinge of said closure, a locking bar, a U-shaped locking bar retaining member carried by said closure and loosely retaining said locking bar for rotative and lateral movement so that it may be engaged with said keepers or be disengaged therefrom, locking cams fixed on said locking bar, and a handle for said locking bar, said cams being positioned to be actuated by the movement of said handle away from the closure hinge whereby the locking bar may be engaged with the keepers and the cams actuated by a continuous movement and the cams released and the locking bar disengaged from the keepers and the closure opened by a continuous movement.

3. In a fastening device, the combination with a closure, of fixed keepers, a locking bar, locking bar retaining members carried by said closure and loosely retaining said locking bar for rotative and lateral movement so that it may be engaged with said keepers or disengaged therefrom, a cam fixed on said locking bar and a handle for said locking bar whereby it may be adjusted laterally to engage and disengage the same with said keepers and rotated to actuate said cam.

In witness whereof, I have hereunto set my hand and seal in the presence of two witnesses.

JAMES EDWARD PIERCE. [L. S.]

Witnesses:
GEORGE E. DEAN,
AGNES E. MERRITT.

Copies of this patent may be obtained for five cents each, by addressing the "Commissioner of Patents, Washington, D. C."